(12) United States Patent
Seo et al.

(10) Patent No.: US 11,454,515 B2
(45) Date of Patent: Sep. 27, 2022

(54) METHOD FOR CALIBRATING GYRO SENSOR ON BASIS OF VEHICLE SPEED

(71) Applicant: HYUNDAI AUTOEVER CORP., Seoul (KR)

(72) Inventors: Myung Hwan Seo, Seoul (KR); Jeong Dong Min, Seongnam-si (KR)

(73) Assignee: HYUNDAI AUTOEVER CORP., Seoul (KR)

(*) Notice: Subject to any disclaimer, the term of this patent is extended or adjusted under 35 U.S.C. 154(b) by 267 days.

(21) Appl. No.: 16/626,848

(22) PCT Filed: Dec. 26, 2017

(86) PCT No.: PCT/KR2017/015453
§ 371 (c)(1),
(2) Date: Dec. 26, 2019

(87) PCT Pub. No.: WO2019/004537
PCT Pub. Date: Jan. 3, 2019

(65) Prior Publication Data
US 2020/0225059 A1 Jul. 16, 2020

(30) Foreign Application Priority Data
Jun. 30, 2017 (KR) .................. 10-2017-0083914

(51) Int. Cl.
*G01C 25/00* (2006.01)
*G01C 21/16* (2006.01)
*G01S 19/01* (2010.01)

(52) U.S. Cl.
CPC .......... *G01C 25/005* (2013.01); *G01C 21/16* (2013.01); *G01S 19/01* (2013.01)

(58) Field of Classification Search
CPC ........ G01C 25/005; G01C 21/16; G01S 19/01
See application file for complete search history.

(56) References Cited

U.S. PATENT DOCUMENTS 5,416,712 A * 5/1995 Geier .................. G01C 21/165
342/357.3
5,862,511 A * 1/1999 Croyle .................. G01C 21/30
(Continued)

FOREIGN PATENT DOCUMENTS

EP     1 218 694 A1    7/2002
JP     2015-184111 A    10/2015
(Continued)

OTHER PUBLICATIONS

Extended European Search Report dated Mar. 15, 2021 for European Patent Application No. 17915625.2.

*Primary Examiner* — Eman A Alkafawi
*Assistant Examiner* — Aeysha N Sultana
(74) *Attorney, Agent, or Firm* — Morgan, Lewis & Bockius LLP

(57) ABSTRACT

The present disclosure relates to a gyro sensor calibration method based on vehicle velocity, which can extract a weighting factor in consideration of vehicle velocity, apply the extracted weighting factor to an extended Kalman filter, and accurately calibrate a gyro sensor in real time, in order to prevent accumulation of scale factor calibration errors, which may occurs as a turning radius is changed depending on vehicle velocity in a turning section, when a GNSS-based dead reckoning (DR) system calibrates a scale factor of the gyro sensor through the extended Kalman filter using GNSS information received in the turning section.

18 Claims, 4 Drawing Sheets

(56) References Cited

U.S. PATENT DOCUMENTS

2002/0128775 A1* 9/2002 Brodie .................... G01S 19/47
                                                                    701/472
2017/0131107 A1   5/2017 Kondoh et al.
2017/0176191 A1* 6/2017 Li ........................ G01C 21/206

FOREIGN PATENT DOCUMENTS

| JP | 2017-15410 A | | 1/2017 | | |
| JP | 2021518529 | * | 8/2021 | ........... | G01C 22/025 |
| KR | 20040031871 | * | 4/2004 | ........... | G08G 1/0968 |
| KR | 10-2011-0107656 A | | 10/2011 | | |
| KR | 10-2012-0042394 A | | 5/2012 | | |
| KR | 10-2016-0038320 A | | 4/2016 | | |

* cited by examiner

METHOD FOR CALIBRATING GYRO SENSOR ON BASIS OF VEHICLE SPEED

CROSS-REFERENCE TO RELATED APPLICATION

The present application is a U.S. National Phase entry of International Patent Application No. PCT/KR2017/015453, filed Dec. 26, 2017, which claims priority to Korean Patent Application No. 10-2017-0083914, filed Jun. 30, 2017, the entire contents of which are incorporated herein for all purposes by this reference.

BACKGROUND OF THE INVENTION

Field of the Invention

The present disclosure relates to a gyro sensor calibration method based on vehicle velocity, and more particularly, to a gyro sensor calibration method based on vehicle velocity, which can extract a weighting factor in consideration of vehicle velocity, apply the extracted weighting factor to an extended Kalman filter, and accurately calibrate a gyro sensor in real time, in order to prevent accumulation of scale factor calibration errors, which may occurs as a turning radius is changed depending on vehicle velocity in a turning section, when a GNSS-based dead reckoning (DR) system calibrates a scale factor of the gyro sensor through the extended Kalman filter using GNSS information received in the turning section.

Description of Related Art

In general, a gyro sensor of a vehicle is used as one of a sensor for measuring the posture of the vehicle and a dead reckoning (DR) sensor for performing DR of a navigation system.

All general sensors including such a gyro sensor for a vehicle inevitably have errors to some extent. Therefore, it is very important to calibrate such an error in order to acquire a precise measurement value of a sensor.

Conventionally, a method for calibrating a gyro sensor for a vehicle has been performed by differentiating the heading direction of the vehicle, which is acquired through GPS information of the vehicle, or comparing the position of the vehicle, calculated through GPS information, to the position of the vehicle, estimated through DR. In the calibration methods for the gyro sensor, however, it is difficult to calculate an accurate value for the heading direction or position of the vehicle, and the calculation process is complex. Thus, an error is highly likely to occur.

In order to perform DR, a geomagnetic sensor and a sensor capable of measuring a pulse by wheel rotation of a vehicle need to be separately installed.

In order to solve such a problem, Korean Patent Application Publication No. 2016-0038320 discloses a gyro sensor calibration apparatus and method for a vehicle. As illustrated in FIG. 1, a control unit first measures an angular velocity and vehicle velocity of a vehicle in step S200, and determines whether the measured angular velocity is equal to or more than a reference value, in step S210. When the measured angular velocity is equal to or more than the reference value, the control unit determines whether a change in the vehicle velocity falls within a first range, based on the measured vehicle velocity, in step S220. When the change in the vehicle velocity falls within the first range, the control unit determines whether a change in the angular velocity falls within a second range, based on the measured angular velocity, in step S230. When the change in the angular velocity falls within the second range, the control unit stores position information of the vehicle in step S240.

However, when the measured angular velocity is less than the reference value, the change in the vehicle velocity does not fall within the first range, or the determination result of step S230 indicates that the change in the angular velocity does not fall within the second range, the control unit checks whether three or more pieces of position information of the vehicle are stored, in step S250.

Then, when the number of pieces of the stored position information of the vehicle is equal to or more than three, the control unit calculates a turning radius of the vehicle based on the stored position information in step S260, and calculates an angular velocity calculation value based on the calculated turning radius of the vehicle and the vehicle velocity, in step S270.

Then, the control unit calibrates the gyro sensor by comparing the calculated angular velocity calculation value and the angular velocity measured through the gyro sensor in step S280. When the number of pieces of the stored position information of the vehicle is less than three, the control unit resets the stored position information in step S290, and restarts measuring the angular velocity of the vehicle and the vehicle velocity.

However, such a related art needs to calculate the angular velocity using the position information and velocity of the vehicle, and continuously calculate the angular velocity in order to calibrate the gyro sensor.

Furthermore, a position error of the vehicle by an inertial sensor including such a gyro sensor corresponds to an ignorable position error when a driver drives the vehicle in person. However, when the vehicle is not driven by the driver but autonomously operates, the position error may cause a serious situation.

DISCLOSURE

Technical Problem

Embodiments of the present invention are directed to a gyro sensor calibration method based on vehicle velocity, which can extract a weighting factor in consideration of vehicle velocity, apply the extracted weighting factor to an extended Kalman filter, and accurately calibrate a gyro sensor in real time, in order to prevent accumulation of scale factor calibration errors, which may occurs as a turning radius is changed depending on vehicle velocity in a turning section, when a GNSS-based dead reckoning (DR) system calibrates a scale factor of the gyro sensor through the extended Kalman filter using GNSS information received in the turning section.

Technical Solution

In an embodiment, a gyro sensor calibration method based on vehicle velocity may include: an initial calibration step in which control logic of a dead reckoning (DR) system performs initial calibration; a weighting factor extraction step in which the control logic extracts a weighting factor based on the relationship between turning velocity of a vehicle and scale factors, stored in a database; a scale factor update step in which the control logic updates a scale factor of a gyro sensor using the weighting factor, when the turning velocity of the vehicle is equal to or more than a threshold value; and a gyro sensor calibration step in which the control logic calibrates the gyro sensor using the updated scale factor of the gyro sensor.

In an embodiment, a DR system may include: a gyro sensor; and control logic configured to calibrate the gyro sensor based on velocity of a vehicle, wherein the control logic performs initial calibration, extracts a weighting factor based on the relationship between turning velocity of the vehicle and scale factors, stored in a database, updates a scale factor of the gyro sensor using the weighting factor when the turning velocity of the vehicle is equal to or more than a threshold value, and calibrates the gyro sensor using the updated scale factor of the gyro sensor.

Advantageous Effects

According to the embodiment of the present disclosure, the gyro sensor calibration method based on vehicle velocity can extract a weighting factor in consideration of vehicle velocity, apply the extracted weighting factor to an extended Kalman filter, and accurately calibrate a gyro sensor in real time, in order to prevent accumulation of scale factor calibration errors, which may occurs as a turning radius is changed depending on vehicle velocity in a turning section, when a GNSS-based DR system calibrates a scale factor of the gyro sensor through the extended Kalman filter using GNSS information received in the turning section.

BEST MODE

Figure 1:
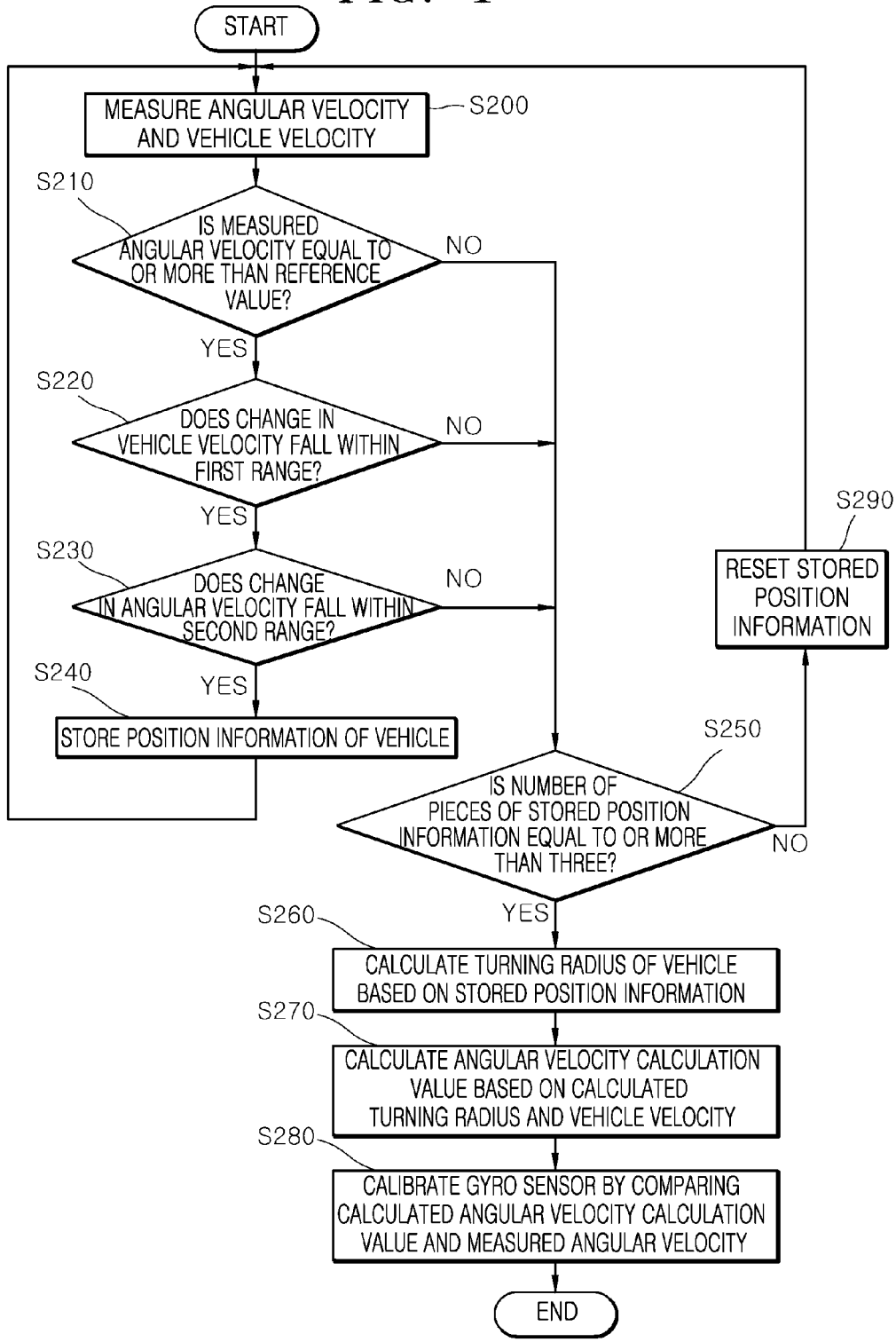
FIG. 1 is a flowchart illustrating a gyro sensor calibration method for a vehicle according to the related art.

The terms used in this specification and claims should not be limited to typical or dictionary definitions, but be construed as definitions and concepts which coincide with the technical idea of the present disclosure, based on the principle that the inventor can properly define the concepts of the terms in order to describe his/her invention in the best way.

Therefore, embodiments described in this specification and configurations illustrated in the drawings are only preferred embodiments of the present disclosure and do not all of represent the technical idea of the present disclosure. Thus, various equivalents and modifications capable of replacing the embodiments can be provided at the point of time that the present specification is filed.

Hereafter, preferred embodiments of the present disclosure will be described in detail with reference to the accompanying drawings.

Figure 2:
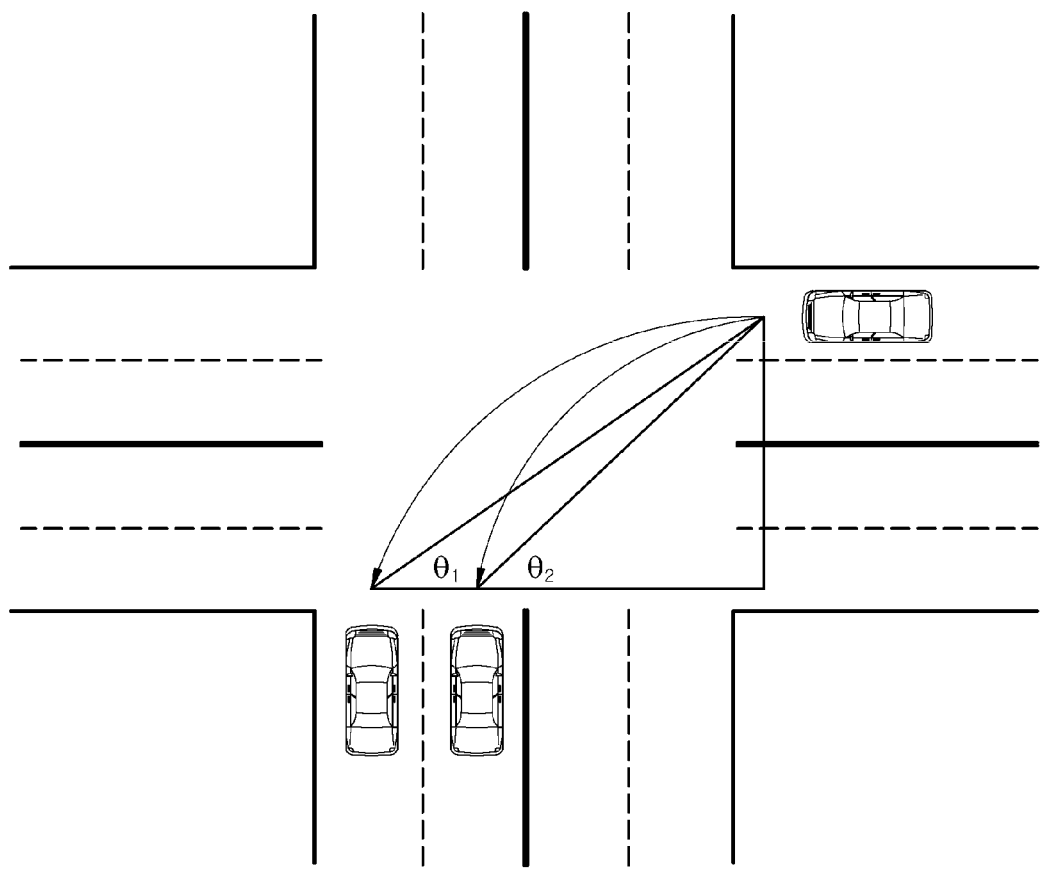
FIG. 2 is a diagram for describing a change in turning radius depending on vehicle velocity in a turning section.

FIG. 2 is a diagram for describing a change in turning radius depending on vehicle velocity in a turning section. When a vehicle makes a turn in an intersection or the like as illustrated in FIG. 2, the turning radius of the vehicle is changed depending on the vehicle velocity. Such a change in turning radius of the vehicle momentarily changes a gyro sensor value, and thus causes a sensor calibration error.

For example, when the vehicle velocity is increased in the case that the vehicle makes a left turn in the intersection, a running radius of the vehicle is increased by acceleration. Thus, the vehicle runs along a radius θ1 instead of a radius θ2. On the contrary, when the vehicle velocity is decreased, the running radius of the vehicle is decreased, and the vehicle runs along the radius θ2.

In this case, since the vehicle makes a left turn regardless of the turning velocity of the vehicle, an output value of the gyro sensor becomes 90 degrees, but the gyro sensor value is momentarily changed depending on the turning velocity of the vehicle. Then, the sensor value is inputted to an extended Kalman filter to cause a calibration error.

Figure 3:
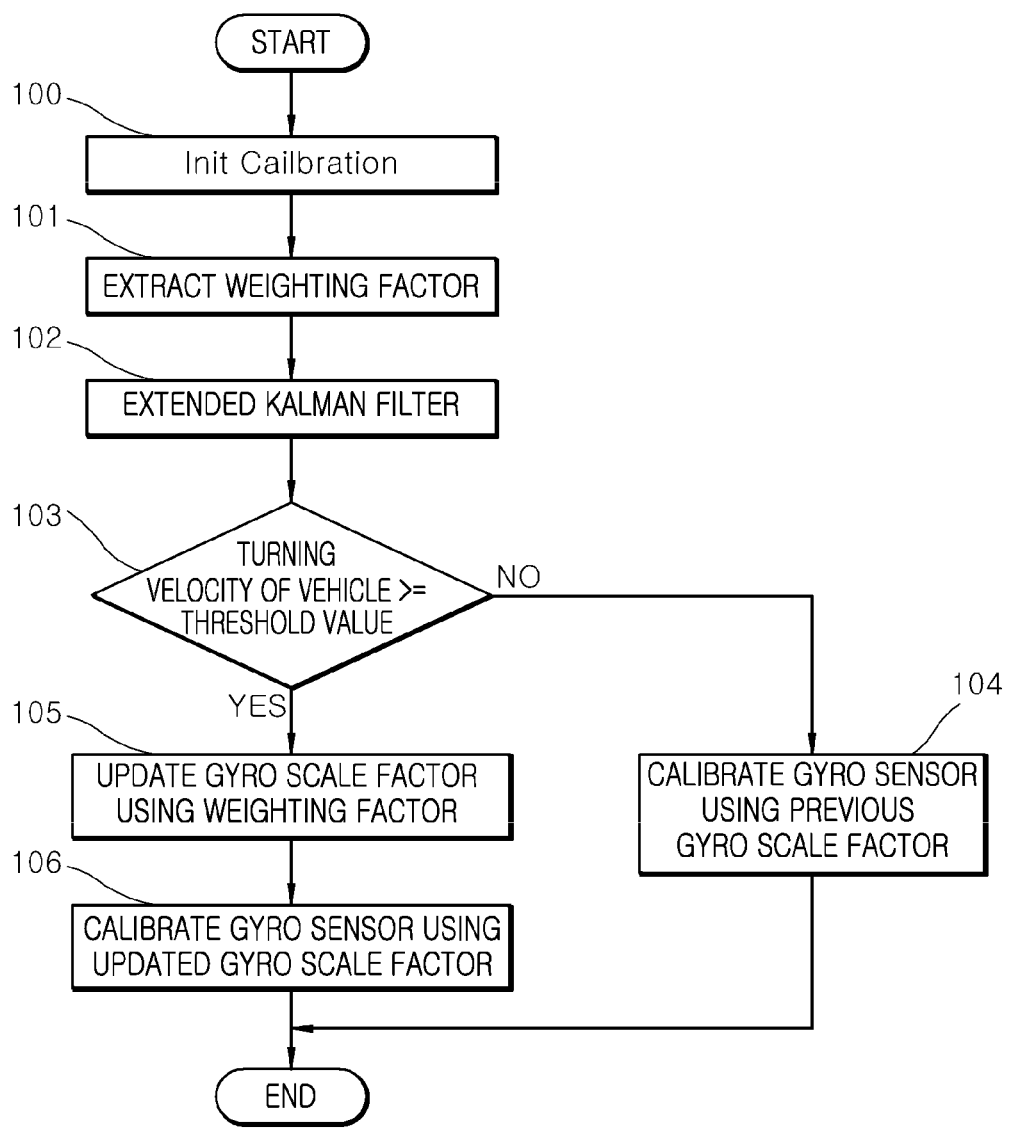
FIG. 3 is a flowchart illustrating a gyro sensor calibration method based on vehicle velocity in accordance with an embodiment of the present disclosure.

FIG. 3 is a flowchart illustrating a gyro sensor calibration method based on vehicle velocity in accordance with an embodiment of the present disclosure. A dead reckoning (DR) system in accordance with the present embodiment includes at least a gyro sensor and control logic.

As illustrated in FIG. 3, the gyro sensor calibration method based on vehicle velocity in accordance with the present embodiment starts with step S100 in which the control logic of the GNSS-based DR system receives GNSS information and gyro sensor information, and performs initial calibration.

Through such initial calibration, the control logic calculates an average value of gyro sensor scale factors. Thus, the control logic stores the relationship between the gyro sensor scale factors and the turning velocity of a vehicle in a database.

Then, the control logic extracts a weighting factor based on the relationship between the turning velocity of the vehicle and the scale factors, stored in the database, in step S101. Here, the control logic calculates an increase ratio between the gyro sensor scale factors corresponding to the maximum value and the minimum value of the turning velocity of the vehicle, based on the relationship between the turning velocity of the vehicle and the scale factors, stored in the database, and extracts a weighting factor corresponding to the turning velocity of the vehicle based on the increase ratio.

The control logic applies the extracted weighting factor to the extended Kalman filter in step S102, and the extended Kalman filter calibrates the position information of the vehicle and the gyro sensor using the GNSS information, the gyro sensor output value and the weighting factor information.

Then, the control logic determines whether the turning velocity of the vehicle is equal to or more than a threshold value, in step S103. When the turning velocity of the vehicle is equal to or more than the threshold value, the control logic updates the scale factor of the gyro sensor using the weighting factor in step S105.

In this case, when the scale factor is updated, the control unit calibrates the scale factor of the gyro sensor by applying a weighting factor, obtained by subtracting the threshold value from the turning velocity of the vehicle, as a weighting factor calculated through the gyro sensor scale factor corresponding to the minimum value of the turning velocity of the vehicle and the gyro sensor scale factor corresponding to the maximum value of the turning velocity of the vehicle.

For example, when the threshold value is 20 km/h and the turning velocity of the vehicle is 40 km/h, a weighting factor of 20 km/h, obtained by subtracting the threshold value of 20 km/h from the turning velocity, is applied as the weighting factor calculated through the gyro sensor scale factor corresponding to the minimum value of the turning velocity and the gyro sensor scale factor corresponding to the maximum value of the turning velocity. According to the weighting factor, the scale factor of the gyro sensor is calibrated.

Then, the control logic calibrates the gyro sensor using the calibrated gyro sensor scale factor in step S106. When the turning velocity of the vehicle is less than the threshold value in step S103, the control logic calibrates the gyro sensor using the previously stored gyro sensor scale factor in step S104.

Figure 4:
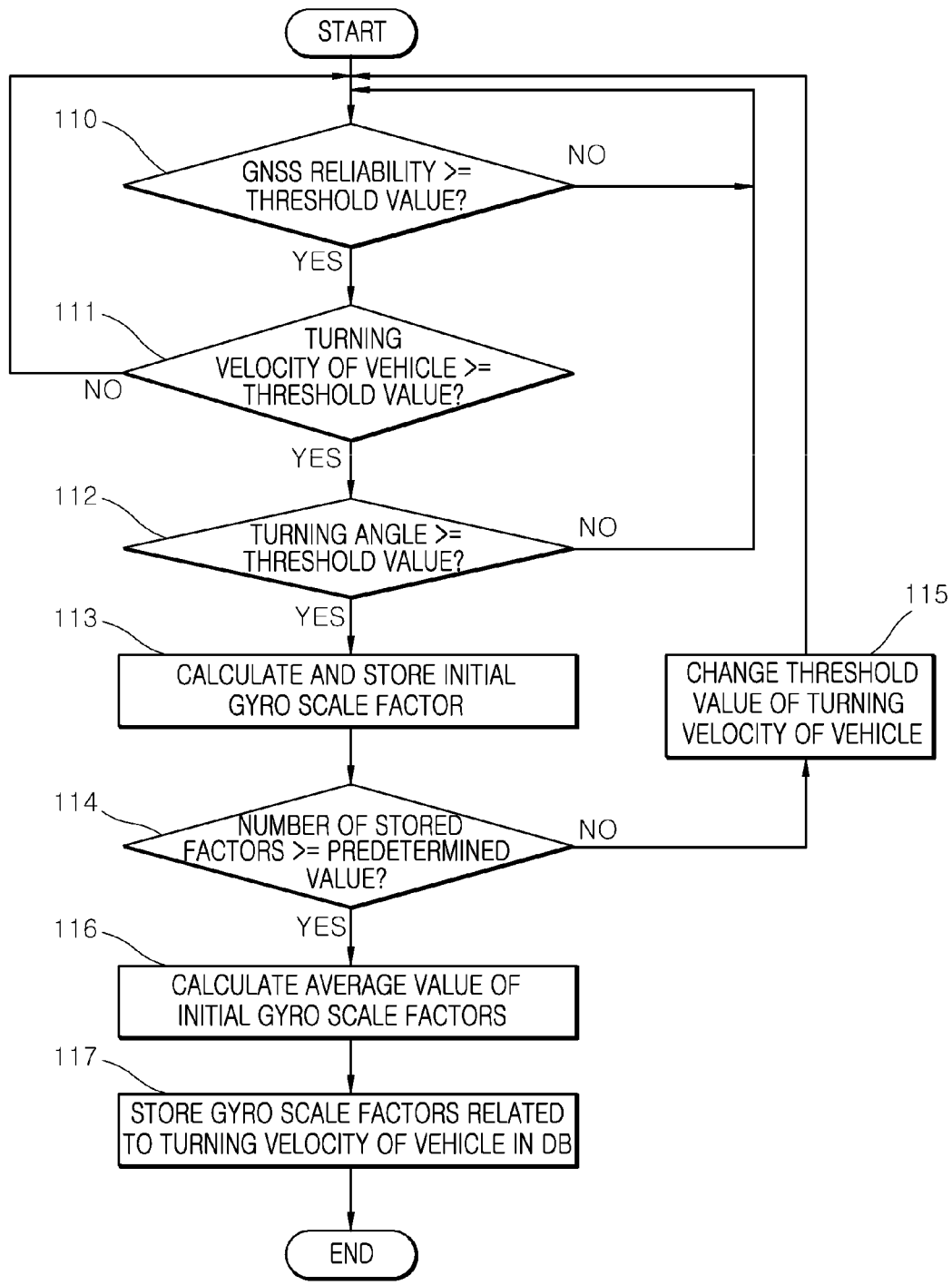
FIG. 4 is a flowchart illustrating an initial calibration method in accordance with an embodiment of the present disclosure.

FIG. 4 is a flowchart illustrating an initial calibration method in accordance with an embodiment of the present disclosure. As illustrated in FIG. 4, the control logic of the GNSS-based DR system determines whether GNSS reliability, the turning velocity of the vehicle, and a turning angle are equal to or more than threshold values, respectively, in steps S110 to S112. When the GNSS reliability, the turning velocity of the vehicle and the turning angle are equal to or more than the respective threshold values, the control logic calculates and stores a scale factor of the gyro sensor in step S113.

The GNSS reliability is determined through NMEA protocol information including the number of satellites, the signal-to-noise ratio of a satellite signal, a horizontal/vertical/position precision reduction rate and a horizontal position error.

Then, the control logic determines whether the number of stored scale factors is equal to or more than a predetermined value, in step S114. When the number of the stored scale factors is equal to or more than the predetermined value, the control logic calculates the average value of the gyro sensor scale factors in step S116, and then stores the relationship between the turning velocity of the vehicle and the gyro sensor scale factors in the database in step S117.

However, when the number of the stored scale factors is less than the predetermined value, the control logic changes the threshold value of the turning velocity of the vehicle, and repeats calibration.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

What is claimed is:

1. A gyro sensor calibration method based on vehicle velocity, the method comprising:
    an initial calibration step in which control logic of a dead reckoning (DR) system performs initial calibration;
    a weighting factor extraction step in which the control logic extracts a weighting factor based on a relationship between turning velocity of a vehicle and scale factors, wherein the scale factors are stored in a database;
    a scale factor update step in which the control logic updates a gyro sensor scale factor of a gyro sensor among the scale factors, using the weighting factor, when the turning velocity of the vehicle is equal to or more than a first threshold value; and
    a gyro sensor calibration step in which the control logic calibrates the gyro sensor using the updated gyro sensor scale factor of the gyro sensor,
    wherein when the turning velocity of the vehicle is less than the first threshold value, the control logic calibrates the gyro sensor using a previously stored gyro sensor scale factor.

2. The gyro sensor calibration method of claim 1, further comprising a weight value application step in which the control logic applies the extracted weighting factor to an extended Kalman filter,
    wherein in the scale factor update step, the control logic updates the gyro sensor scale factor of the gyro sensor using the weighting factor applied to the extended Kalman filter.

3. The gyro sensor calibration method of claim 1, wherein in the initial calibration step, the control logic calculates an average value of gyro sensor scale factors, and stores a relationship between the gyro sensor scale factors and the turning velocity of the vehicle in a database.

4. The gyro sensor calibration method of claim 3, wherein the initial calibration step comprises:
    determining whether Global Navigation Satellite System (GNSS) reliability, the turning velocity of the vehicle and a turning angle are equal to or more than a second threshold value, respectively;
    calculating and storing the gyro sensor scale factor when the GNSS reliability, the turning velocity of the vehicle and the turning angle are equal to or more than the second threshold values, respectively;
    determining whether a number of the stored scale factors is equal to or more than a predetermined value; and
    calculating the average value of the gyro sensor scale factors when the number of the stored scale factors is equal to or more than the predetermined value.

5. The gyro sensor calibration method of claim 4, wherein the initial calibration step further comprises changing the second threshold value of the turning velocity of the vehicle to repeat calibration, when the number of the stored scale factors is less than the predetermined value.

6. The gyro sensor calibration method of claim 4, wherein the GNSS reliability is determined through National Marine Electronics Association (NMEA) protocol information including a number of satellites, a signal-to-noise ratio of a satellite signal, a horizontal/vertical/position precision reduction rate, and a horizontal position error.

7. The gyro sensor calibration method of claim 4, wherein when extracting the weighting factor, the control logic calculates an increase ratio between the gyro sensor scale factors corresponding to a maximum value and a minimum value of the turning velocity of the vehicle based on the relationship between the scale factors and the turning velocity of the vehicle, and extracts the weighting factor corresponding to the turning velocity of the vehicle based on the increase ratio.

8. The gyro sensor calibration method of claim 4, wherein when the number of the stored scale factors is less than the predetermined value, the control logic changes the first threshold value of the turning velocity of the vehicle to repeat calibration.

9. The gyro sensor calibration method of claim 2, wherein the extended Kalman filter calibrates the position information of the vehicle and the gyro sensor using Global Navigation Satellite System (GNSS) reliability information, a gyro sensor output value and weighting factor information.

10. The gyro sensor calibration method of claim 7, wherein the control logic calibrates gyro sensor scale factors of the gyro sensor by applying a weighting factor obtained by subtracting the first threshold value from the turning velocity of the vehicle, as the weighting factor calculated through the gyro sensor scale factor corresponding to a minimum value of the turning velocity of the vehicle and the gyro sensor scale factor corresponding to a maximum value of the turning velocity of the vehicle.

11. A dead reckoning (DR) system comprising:
a gyro sensor; and
control logic configured to calibrate the gyro sensor based on velocity of a vehicle,
wherein the control logic performs initial calibration, extracts a weighting factor based on a relationship between turning velocity of the vehicle and scale factors, the scale factors being stored in a database, updates a gyro sensor scale factor of the gyro sensor, among the scale factors, using the weighting factor when the turning velocity of the vehicle is equal to or more than a first threshold value, and calibrates the gyro sensor using the updated gyro sensor scale factor of the gyro sensor,
wherein when the turning velocity of the vehicle is less than the first threshold value, the control logic calibrates the gyro sensor using a previously stored gyro sensor scale factor.

12. The DR system of claim 11, wherein the control logic applies the extracted weighting factor to an extended Kalman filter, and updates the gyro sensor scale factor of the gyro sensor using the weighting factor applied to the extended Kalman filter.

13. The DR system of claim 11, wherein when performing the initial calibration, the control logic calculates an average value of gyro sensor scale factors, and stores a relationship between gyro sensor scale factors and the turning velocity of the vehicle in a database.

14. The DR system of claim 13, wherein when performing the initial calibration, the control logic calculates and stores the gyro sensor scale factor when Global Navigation Satellite System (GNSS) reliability, the turning velocity of the vehicle and a turning angle are equal to or more than a second threshold value, respectively, determines whether a number of the stored scale factors is equal to or more than a predetermined value, and calculates an average value of the gyro sensor scale factors when the number of the stored scale factors is equal to or more than the predetermined value.

15. The DR system of claim 14, wherein the GNSS reliability is determined through National Marine Electronics Association (NMEA) protocol information including a number of satellites, a signal-to-noise ratio of a satellite signal, a horizontal/vertical/position precision reduction rate, and a horizontal position error.

16. The DR system of claim 14, wherein when extracting the weighting factor, the control logic calculates an increase ratio between the gyro sensor scale factors corresponding to a maximum value and a minimum value of the turning velocity of the vehicle based on the relationship between the scale factors and the turning velocity of the vehicle, and extracts the weighting factor corresponding to the turning velocity of the vehicle based on the increase ratio.

17. The DR system of claim 14, wherein when the number of the stored scale factors is less than the predetermined value, the control logic changes the second threshold value of the turning velocity of the vehicle to repeat calibration.

18. The DR system of claim 16, wherein the control logic calibrates the gyro sensor scale factor of the gyro sensor by applying a weighting factor obtained by subtracting the first threshold value from the turning velocity of the vehicle, as the weighting factor calculated through the gyro sensor scale factor corresponding to the minimum value of the turning velocity of the vehicle and the gyro sensor scale factor corresponding to the maximum value of the turning velocity of the vehicle.

* * * * *